A. H. ROGERS.
Elastic Faced Printing Type.
No. 201,632.   Patented March 26, 1878.
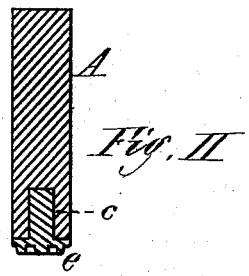
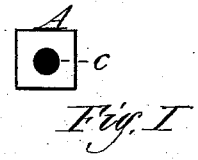
Witnesses: T. A. Curtis.
C. E. Buckland.
Inventor.
Arthur H Rogers.

UNITED STATES PATENT OFFICE.

ARTHUR H. ROGERS, OF SPRINGFIELD, MASSACHUSETTS.

IMPROVEMENT IN ELASTIC-FACED PRINTING-TYPES.

Specification forming part of Letters Patent No. 201,632, dated March 26, 1878; application filed December 13, 1877.

*To all whom it may concern:*

Be it known that I, ARTHUR H. ROGERS, of Springfield, in the State of Massachusetts, have invented a new and useful Improvement in Elastic-Faced Printing-Type; and that the following is a full, clear, and exact description thereof, reference being had to the accompanying drawings, making a part of this specification, and to the letters of reference marked thereon.

My invention relates to a printing-type having an elastic printing-face, and adapted to be set up singly in any ordinary stamp or form, to make up and print any desired subject-matter; and it consists of a metal body or base, of the usual form ordinarily used by printers, and having a vulcanized-rubber type-face attached to one end of the metal body, as will be more fully hereinafter described.

Figure I is a plan view of the end of the metal body to which the rubber printing-face is to be attached, and Fig. II is a longitudinal central section through the metal body and rubber face after the latter is attached.

In the drawings, A represents the metal body of an ordinary type; but instead of a printing-metal face being made on the lower end, in the usual manner, the end is made plane or flat, and a hole, c, made therein to any desired depth. (Shown also in Fig. II.) To this end of the metal body, having the hole c therein, is firmly secured a rubber printing-face, e, which adheres firmly to the metal body A.

The following is the process I use for attaching this elastic printing-face to the metal body: I take any number of alphabets of ordinary printing-type, of any desired styles of letters, and arrange them in an ordinary printers' form or chase, except that it is sufficiently deep to take in the whole length of the body to which the rubber face is to be attached, and with sufficient space between each two adjacent types, in both directions, to introduce a knife between them. When they are thus secured, I place upon the printing-faces of these types a layer of some plastic material which will set or afterward become hard, to form a mold—such as plaster-of-paris, or some similar substance. When this has set I carefully remove it, and remove also the type from the form, and place in their stead, in exactly the same places, the metal bodies, of the same size, with both ends squared off, and with the hole c in one end, the latter occupying the same position in the form as did the metal printing-faces of the type which were removed. I then place a sheet of rubber in the same position upon these metal bodies as the plastic material occupied upon the metal-faced type, place the mold formed upon this sheet, and then place the whole between two iron plates, and bolt them strongly together, which drives the rubber into the letters of the mold, and also into the cavity in the ends of the metal bodies, and the whole is then inclosed in a vulcanizing pan or vessel, and heated, as in the ordinary process of vulcanizing rubber. When this is completed, I remove the whole from the pan or vessel, remove the mold, and all the metal bodies are held to the rubber sheet, the latter having, by the vulcanizing-process and the pressure applied, entered and filled the hole c in each body, and a letter of rubber is formed on each body corresponding to the letter of each metal type which occupied the position of the respective bodies. I then pass a sharp knife into the spaces between the metal bodies and cut the rubber sheet between the letters, so that each body is entirely separate from the others; and, if required, the superfluous rubber on the edges around each letter may be trimmed off by a sharp knife or other means, and the type are ready for use.

The type thus made have an elastic printing-face, and possess all the advantages of ordinary rubber impression-plates, while all the disadvantages of such plates are obviated. For example, if a person desires to print, with rubber, his name, together with any special business or other matter connected therewith, the whole ordinarily has to be made in one rubber plate, and such plate cannot be changed to print any other matter connected with his name. By the use of my invention, however, such person can himself set up these metal-bodied rubber type in any common stamp or form constructed for holding ordinary metal type, clamp them firmly together, and print the desired matter, and then change the stamp, or any part of it, by removing any number of the type and inserting and securing others. This cannot be done with any solid rubber type, as the rubber, being elastic, is pressed entirely out of shape and place by the operation of clamping or locking up for the purpose of holding them while printing.

Having thus described my invention, what I claim as new is—

An improved printing-type, consisting of the metal body A, having a recess, $c$, made in one end, and the elastic or rubber face $e$ pressed into said recess and secured, substantially as herein described.

ARTHUR H. ROGERS.

Witnesses:
   T. A. CURTIS,
   C. E. BUCKLAND.